United States Patent
Chen et al.

(10) Patent No.: US 8,458,976 B2
(45) Date of Patent: Jun. 11, 2013

(54) THERMAL PROTECTION BLANKET ASSEMBLY

(75) Inventors: Winnie W Chen, Huntington Beach, CA (US); Edward A Zadorozny, Redondo Beach, CA (US); Conley S Thatcher, Placentia, CA (US); Jonathan D Embler, Huntington Beach, CA (US); Leanne L Lehman, Aliso Viejo, CA (US); Thomas Pinney, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 234 days.

(21) Appl. No.: 12/580,478

(22) Filed: Oct. 16, 2009

(65) Prior Publication Data
US 2011/0088856 A1    Apr. 21, 2011

(51) Int. Cl.
*B64G 1/58* (2006.01)

(52) U.S. Cl.
USPC ...................................... 52/404.1; 244/171.7

(58) Field of Classification Search
USPC 52/63, 404.1, 407.1, 407.2, 405.3; 244/171.7
See application file for complete search history.

(56) References Cited

U.S. PATENT DOCUMENTS

| | | | | |
|---|---|---|---|---|
| 5,038,693 A | * | 8/1991 | Kourtides et al. | 244/171.7 |
| 5,154,373 A | * | 10/1992 | Scott | 244/117 R |
| 6,007,026 A | | 12/1999 | Shorey | |
| 6,299,106 B1 | * | 10/2001 | Shorey | 244/171.7 |
| 6,652,950 B2 | | 11/2003 | Barney et al. | |
| 6,844,091 B2 | | 1/2005 | Denham | |
| 2005/0075026 A1 | | 4/2005 | DiChiara, Jr. | |

FOREIGN PATENT DOCUMENTS

| | | |
|---|---|---|
| EP | 1086891 A2 | 3/2001 |
| WO | 9900302 A1 | 1/1999 |
| WO | 9900303 A1 | 1/1999 |

OTHER PUBLICATIONS

EP search report dated Dec. 30, 2011 regarding EP 10187742, 5 Pages.

\* cited by examiner

*Primary Examiner* — Joshua J Michener
*Assistant Examiner* — Matthew J Smith
(74) *Attorney, Agent, or Firm* — Yee & Associates, P.C.

(57) ABSTRACT

A blanket assembly includes a shear fabric and an attachment frame wrapped in the shear fabric. A thermal protection blanket is carried by the shear fabric.

14 Claims, 3 Drawing Sheets

THERMAL PROTECTION BLANKET ASSEMBLY

This invention was made with Government support under F33615-00-D-3052 awarded by the Air Force. The government has certain rights in this invention.

TECHNICAL FIELD

The present disclosure relates to thermal protection blankets which are suitable for aerospace applications. More particularly, the present disclosure relates to a blanket assembly having a thermal protection blanket which is mechanically attached to a fabric-covered attachment frame for shear reinforcement and longevity purposes.

BACKGROUND

Reusable space launch vehicles may require thermal insulation to protect the vehicle from heat during reentry. Currently, flexible ceramic thermal protection blankets may be used to cover a portion of the exterior of such vehicles for heat protection. In some applications, the thermal protection blanket may be attached to a frame on the vehicle at multiple frame attachment points. Because the blanket may not be directly locked to the frame but may be sewn around it, however, the blanket may shift slightly relative to the frame during vehicle operation. The in-plane motion of the blanket may lead to excessive rubbing and wear of the sidewalls of the blanket against adjacent structure.

One approach to reducing excessive wear of the thermal protection blanket may include the use of batting to fill any pockets around the frame to "pot" the frame tightly within the blanket. Additionally, the sewing thread for the construction of the blanket itself may be stitched as close to the frame as possible such that the thread may form tight channels into which the frame can be locked. One drawback of this method is that the batting may be too soft and crushable to withstand pressures from movement of the blanket relative to the frame. Moreover, sewing processes may prevent the stitch lines from being sewn close enough to the frame to effectively lock it in place.

Another approach to reducing excessive wear of the blanket may include sewing of the frame directly to the IML layer of fabric on an outer blanket and then filling of the gap between the primary structure and the frame with a second OML blanket that is bonded to the structure. However, this approach may require bonding of the second IML blanket to the structure and may add weight to the vehicle.

Therefore, a blanket assembly having a thermal protection blanket which is mechanically attached to a fabric-covered attachment frame to minimize in-plane shear movement of the thermal protection blanket due to vibration, acoustic, aerodynamic or structural deflection loads is needed to enhance longevity of the blanket.

SUMMARY

The present disclosure is generally directed to a blanket assembly. An illustrative embodiment of the blanket assembly includes a fabric frame assembly comprising a shear fabric and an attachment frame wrapped in the shear fabric. A thermal protection blanket is carried by the shear fabric of the fabric frame assembly.

In some embodiments, the blanket assembly may include a fabric frame assembly comprising a shear fabric and an attachment frame wrapped in the shear fabric. A thermal protection blanket may include an inner fabric layer carried by the shear fabric of the fabric frame assembly, a batting layer carried by the inner fabric layer and at least one outer fabric layer provided around the batting layer.

The present disclosure is further generally directed to a method of fabricating a blanket assembly. An illustrative embodiment of the method includes providing a thermal protection blanket having a batting layer and an outer fabric layer surrounding the batting layer; providing a fabric frame assembly having sheer fabric and an attachment frame wrapped in the shear fabric; and forming a blanket assembly by attaching the batting layer and the outer fabric layer of the thermal protection blanket to the sheer fabric of the fabric frame assembly.

BRIEF DESCRIPTION OF THE ILLUSTRATIONS

DETAILED DESCRIPTION

Figure 1:
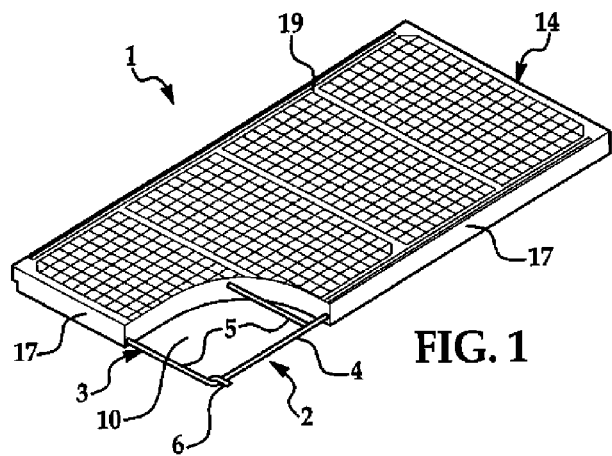
FIG. 1 is a perspective view, partially in section, of an illustrative embodiment of the blanket assembly.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description Referring to FIGS. 1-5, an illustrative embodiment of the blanket assembly is generally indicated by reference numeral 1. In some applications, the blanket assembly 1 may be provided on the exterior of a space launch vehicle (not shown) to protect the vehicle from heat during reentry. The blanket assembly 1 may include a fabric frame assembly 2 and a thermal protection blanket 14 which is provided on the fabric frame assembly 2. The thermal protection blanket 14 may be stitched and/or otherwise attached to the fabric frame assembly 2 as will be hereinafter described to impart resistance of the thermal protection blanket 14. Accordingly, the thermal protection blanket 14 may be resistant to in-plane or shear movement due to vibration, acoustic, aerodynamic, structural deflection loads or other loads such as during operation of the space launch vehicle.

Figure 3:
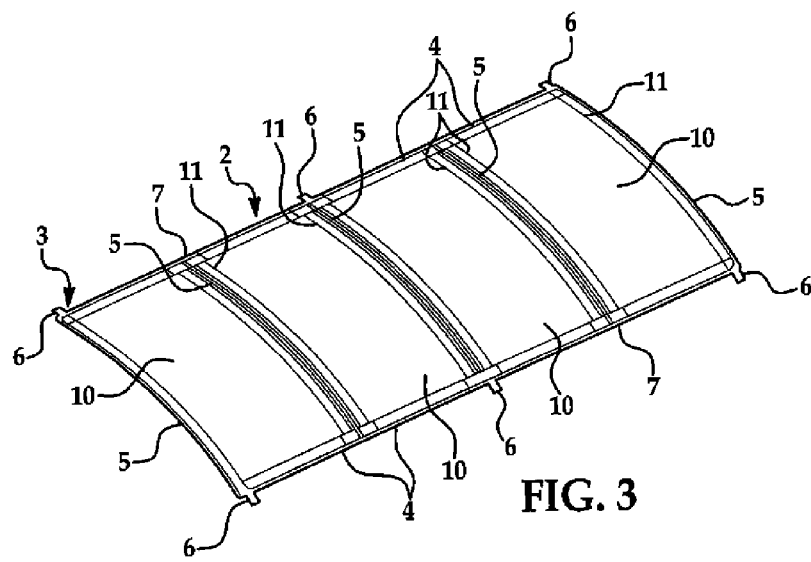
FIG. 3 is a perspective view of a fabric frame assembly of an illustrative embodiment of the blanket assembly.
Figure 4:
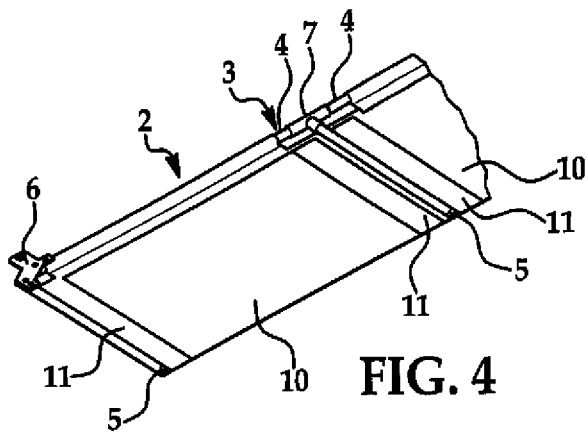
FIG. 4 is a perspective view, partially in section, of the fabric frame assembly of an illustrative embodiment of the blanket assembly.

As shown in FIGS. 3 and 4, the fabric frame assembly 2 may include an attachment frame 3 which in some embodiments may have a generally elongated, rectangular shape, as shown in FIG. 3. In other embodiments, the attachment frame 3 may have other shapes. In some embodiments, the attachment frame 3 of the fabric frame assembly 2 may include multiple longitudinal frame members which may be connected to each other end-to-end. Multiple transverse frame members 5 may extend between the longitudinal frame members 4. Each of the longitudinal frame members 4 and the transverse frame members 5 may be metal tubing, for example and without limitation. A T-connector 7 may connect adjacent longitudinal frame members 4 to each other and each transverse frame member 5 to a corresponding pair of longitudinal frame members 4 in the attachment frame 3. In some embodiments, frame attachment brackets 6 may be provided at the respective corners and/or at other locations on the attachment frame 3 to facilitate attachment of the attachment frame 3 to a support structure (not shown) provided on a space launch vehicle or other structure. In other embodiments, alternative fastening techniques known to those skilled in the art may be used instead of or in addition to the frame attachment brackets 6.

A shear fabric 10 may be provided on the attachment frame 3 of the fabric frame assembly 2. In some embodiments, discrete panels of the shear fabric 10 may be provided on the attachment frame 3. The shear fabric 10 may be attached to the attachment frame 3 according to any suitable technique, which is known to those skilled in the art. In some embodiments, the panel edges of the panels of shear fabric 10 may be extended or wrapped around the longitudinal frame members 4 and transverse frame members 5 of the fabric frame assembly 2 to form a fabric doubler 11. The fabric doubler 11 may be sewn and/or otherwise attached to the shear fabric 10 according to the knowledge of those skilled in the art. Accordingly, the shear fabric 10 may span the longitudinal frame members 4 and the transverse frame members 5 and may be disposed within the same plane as the attachment frame 3.

Figure 2:
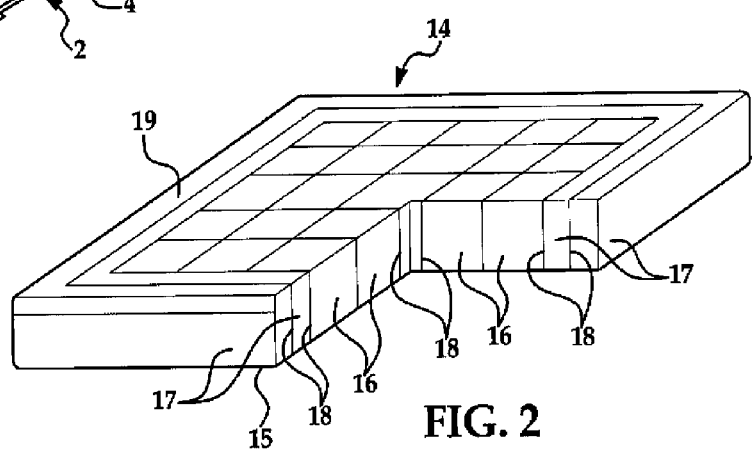
FIG. 2 is a perspective view, partially in section, of a thermal protection blanket of an illustrative embodiment of the blanket assembly.

As shown in FIGS. 1 and 2, the thermal protection blanket 14 of the blanket assembly 1 may include batting 15 which may be a heat-resistant material such as ceramic, for example and without limitation. In some embodiments, the batting 15 may include alumina. At least one outer fabric layer 17 may be provided around the batting 15. The outer fabric layer 17 may be a heat-resistant ceramic such as alumina or other material. In some embodiments, stitching thread 18 may be used to attach the outer fabric layer 17 to the batting layer 16. In other embodiments, alternative techniques may be used to attach the outer fabric layer 17 to the batting layer 16. A heat-resistant outer coating 19 which may be a ceramic such as alumina, for example and without limitation, may be provided on the batting layer 16 and on the outer fabric layer or layers 17.

Figure 5:
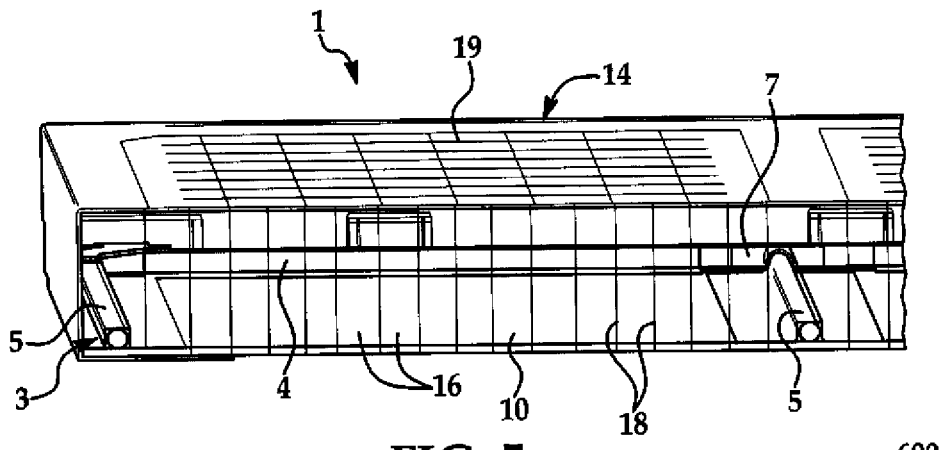
FIG. 5 is a cross-sectional view of an illustrative embodiment of the blanket assembly.

As shown in FIG. 5, in fabrication of the blanket assembly 1, the thermal protection blanket 14 may be provided on the fabric frame assembly 2. The batting layer 16 and the outer fabric layer or layers 17 may be attached to the shear fabric 10 of the attachment frame 3 using stitching thread 18 and/or other suitable attachment techniques known to those skilled in the art. In some embodiments, an inner fabric layer 15 which may be ceramic such as alumina or other suitable heat-resistant material may be provided between the thermal protection blanket 14 and the fabric frame assembly 2. Accordingly, the stitching thread 18 may attach the batting layer 16 and the outer fabric layer 17, along with the inner fabric layer 15, to the shear fabric 18 such that those elements together define a single fabric layer. The shear fabric 10 couples the attachment frame 3 to the stitching thread 18 of the thermal protection blanket 14. This may prevent in-plane motion of the thermal protection blanket 14 relative to the attachment frame 3 due to vibration, acoustic, aerodynamic or structural deflection loads during use of the blanket assembly 1 on a space launch vehicle (not shown) or in any other suitable application. Moreover, the shear fabric 10 maintains in-plane coupling while allowing placement of the attachment frame 3 at any height through the thickness of the thermal protection blanket 14.

Figure 6:
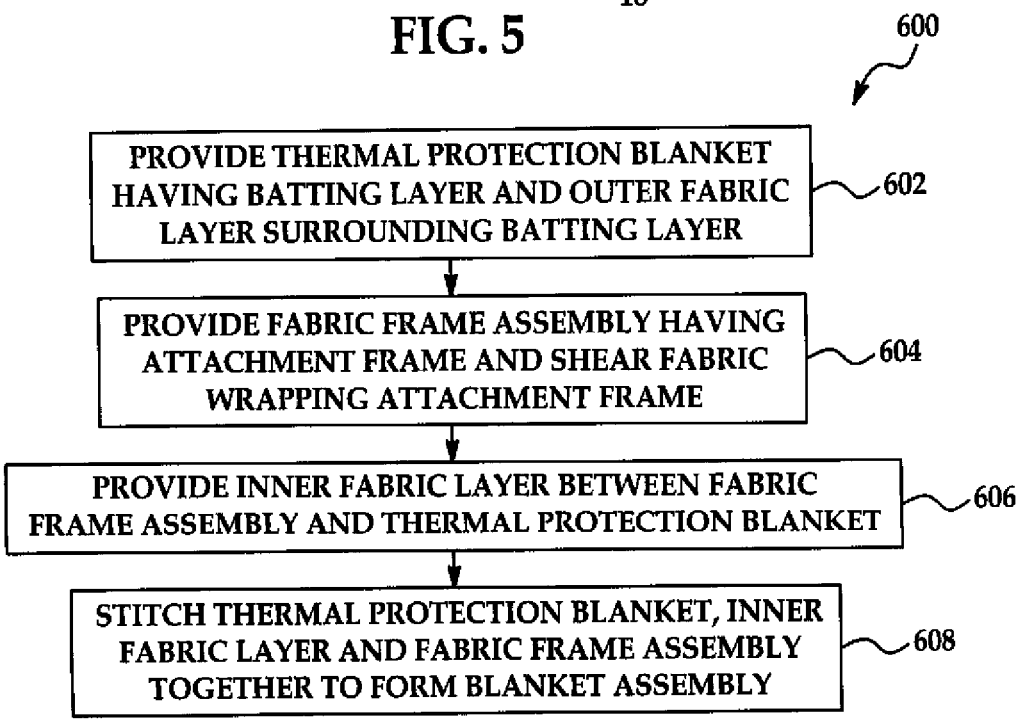
FIG. 6 is a flow diagram of an illustrative embodiment of a method of fabrication of a blanket assembly.

Referring next to FIG. 6, a flow diagram 600 of an illustrative embodiment of a method of fabrication of a blanket assembly is shown. In block 602, a thermal protection blanket having a batting layer and an outer fabric layer surrounding the batting layer is provided. In some embodiments, an outer coating may be provided on the batting layer and the outer fabric layer of the thermal protection blanket. In block 604, a fabric frame assembly having an attachment frame and shear fabric wrapping the attachment frame may be provided. In block 606, an inner fabric layer may be provided between the shear fabric of the fabric frame assembly and the thermal protection blanket. In block 608, the thermal protection blanket, the inner fabric layer and the fabric frame assembly are stitched together to form the blanket assembly.

Figure 7:
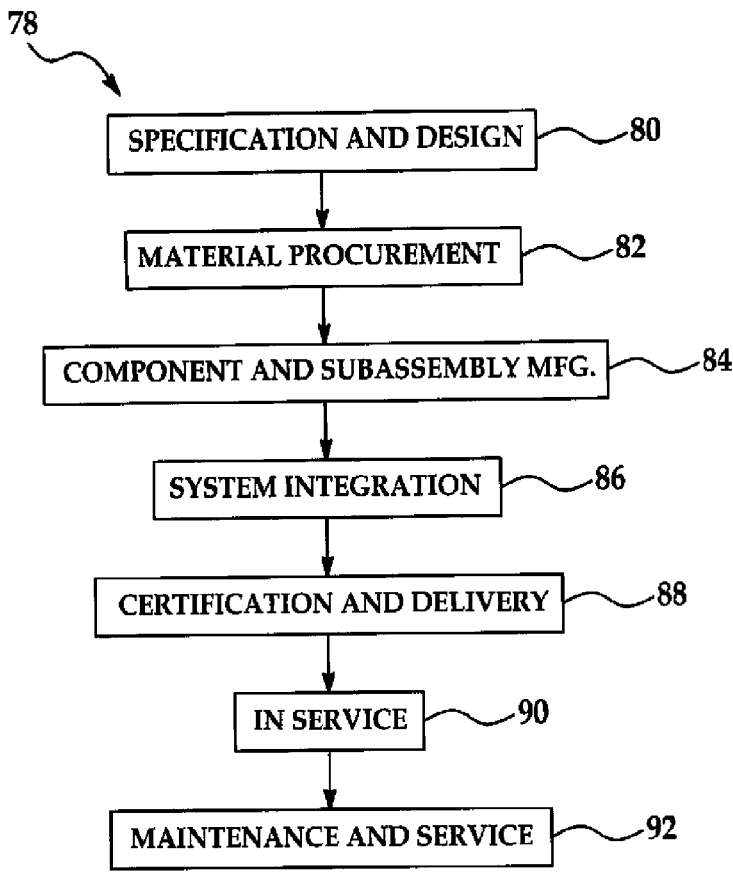
FIG. 7 is a flow diagram of an aircraft production and service methodology.
Figure 8:
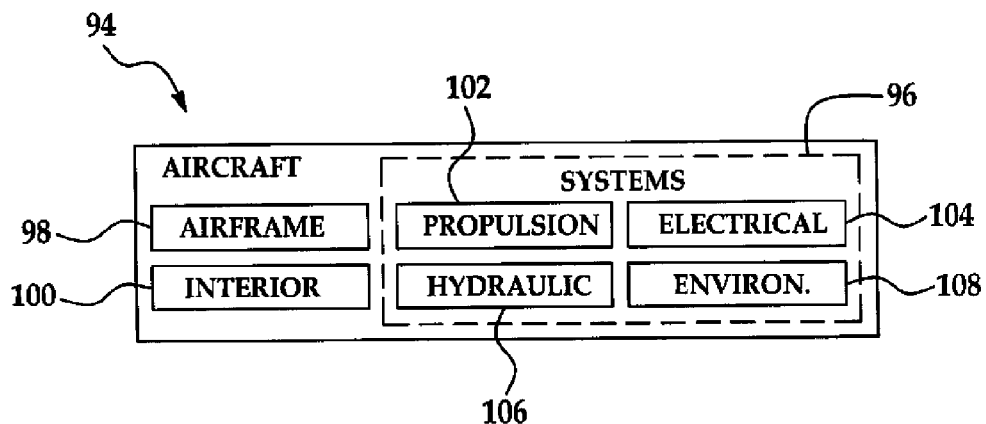
FIG. 8 is a block diagram of an aircraft.

Referring next to FIGS. 7 and 8, embodiments of the disclosure may be used in the context of an aircraft manufacturing and service method 78 as shown in FIG. 7 and an aircraft 94 as shown in FIG. 8. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 8, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A blanket assembly, comprising:
   an attachment frame comprising a plurality of connected frame members;
   a fabric frame assembly comprising a shear fabric connected to the attachment frame and between the plurality of connected frame members;
   a batting layer, wherein a first side of the batting layer is disposed on a side of the shear fabric;
   a thermal protection blanket comprising the batting layer attached to a first fabric layer wherein the first fabric layer is wrapped at least partially around the batting layer along a perimeter of the batting layer, wherein a third side of the batting layer that is opposite the first side is substantially even with a fourth side of the first fabric layer, wherein the attachment frame is disposed at least partially inside the first fabric layer, and wherein the first fabric layer comprises a heat-resistant material; and
   a thread that stitches the thermal protection blanket to the fabric frame assembly.

2. The blanket assembly of claim 1 wherein the thread extends through the batting and into the shear fabric.

3. The blanket assembly of claim 1 wherein the plurality of connected frame members comprises longitudinal frame members and transverse frame members extending between said longitudinal frame members.

4. The blanket assembly of claim 1 further comprising a plurality of frame attachment brackets connected to the attachment frame.

5. The blanket assembly of claim 1 further comprising:
   a second fabric layer provided between the thermal protection blanket and the fabric frame assembly.

6. The blanket assembly of claim 1 wherein stitching created by the thread is configured to prevent in-plane motion of the shear fabric, the batting layer, and the first fabric layer relative to the attachment frame.

7. The blanket assembly of claim 1 wherein the first fabric layer further comprises a second fabric layer wrapped at least partially around the batting layer along a perimeter of the batting layer, wherein the second fabric layer comprises a heat-resistant material.

8. The blanket assembly of claim 1 further comprising:
   a heat-resistant coating covering the batting layer and the first fabric layer.

9. The blanket assembly of claim 1 wherein said attachment frame is generally rectangular.

10. The blanket assembly of claim 1 wherein said shear fabric comprises a plurality of shear fabric panels wrapped on the attachment frame.

11. The blanket assembly of claim 1 wherein the batting layer comprises a first ceramic material and the first fabric layer comprises a second ceramic material.

12. A method comprising:
   connecting a shear fabric between a plurality of connected frame members of an attachment frame;
   placing a side of a batting layer on a side of the shear fabric;
   wrapping a first fabric layer comprising a heat-resistant material at least partially around the batting layer along a perimeter of the batting layer such that a third side of the batting layer that is opposite the first side is substantially even with a fourth side of the first fabric layer and such that the frame assembly is disposed at least partially inside the first fabric layer; and
   stitching a thread through the shear fabric, the batting layer, and the first fabric layer to form a blanket.

13. The method of claim 12 wherein stitching further includes stitching the thread such that, responsive to a given force applied to the blanket, in-plane motion of the shear fabric, the batting layer, and the first fabric layer is substantially prevented relative to the attachment frame.

14. The method of claim 12 further comprising:
   applying a heat-resistant coating to the batting layer and the first fabric layer.

* * * * *